May 13, 1958 F. M. SMITS 2,834,697

PROCESS FOR VAPOR-SOLID DIFFUSION OF A CONDUCTIVITY-TYPE DETERMINING IMPURITY IN SEMICONDUCTORS

Filed May 18, 1956

INVENTOR
F. M. SMITS
BY Arthur J. Torsiglieri
ATTORNEY

United States Patent Office 2,834,697

Patented May 13, 1958

2,834,697

PROCESS FOR VAPOR-SOLID DIFFUSION OF A CONDUCTIVITY-TYPE DETERMINING IMPURITY IN SEMICONDUCTORS

Friedolf M. Smits, Morristown, N. J., assignor to Bell Telephone Laboratories, Incorporated, New York, N. Y., a corporation of New York Application May 18, 1956, Serial No. 585,851

10 Claims. (Cl. 148—1.5)

Figure 1:
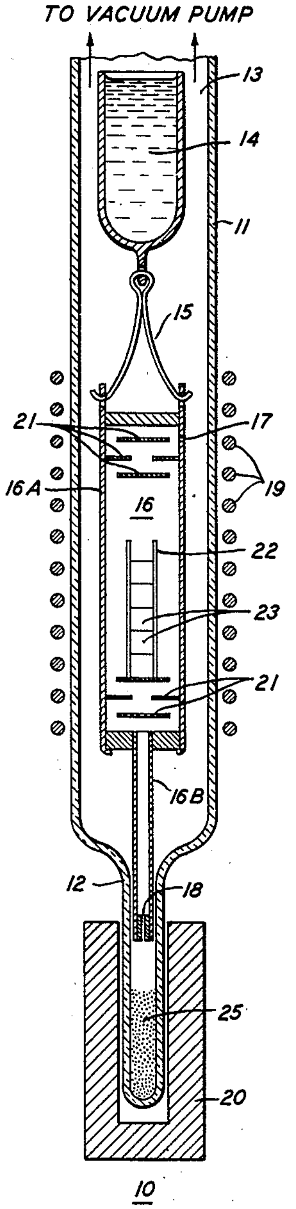

This invention relates to the fabrication of semiconductive devices, and more particularly it relates to the introduction of conductivity-type determining impurities in a semiconductive body by vapor-solid diffusion. Vapor-solid diffusion is used to describe the technique in which a semiconductive body is heated in the presence of a vapor of a conductivity-type determining impurity to a temperature at which the impurity diffuses into the solid semiconductor without significant melting of the semiconductor.

The invention will be described with specific reference to silicon since the invention is particularly advantageous when applied thereto. However, it should be evident that the principles have wide application.

For vapor-solid diffusion in silicon, it has generally been found necessary to heat the silicon to at least 1000° C. if sufficient diffusion for useful applications (at least 100 Angstroms) is to take place in a reasonable diffusion time, for example, less than ten hours. With previously employed diffusion techniques it has proved exceedingly difficult to maintain clean silicon surfaces during diffusion at such temperatures. Small amounts of contaminants present initially on the surface or in the diffusion furnace give rise to uncontrollable etching of the surface or formation of compounds which unless special precautions are observed may make difficult achieving reproducible results. Accordingly, in the past, it has been necessary to prepare the surfaces of silicon wafers carefully before the diffusion treatment and to avoid scrupulously any contaminants in the diffusion furnace. The observation of the necessary precautions is time consuming and imposes limitations which makes more difficult large scale manufacture.

An important object of the present invention is to minimize the need for preliminary treatment of the surfaces of the silicon before diffusion and thereby to facilitate vapor-solid diffusion in silicon.

Another object is to reduce the effect of any contaminants originally present in the equipment used to effect the vapor-solid diffusion.

The desired ends are realized in accordance with the invention by diffusing into a surface which is simultaneously being etched so that a fresh surface is continuously being formed. In this way, it is assured that contaminants originally on the surface or in the diffusion furnace have a minimum effect on the end product. It can be appreciated that etching in the conventional manner is incompatible with solid-vapor diffusion. In the practice of the invention the etching, in order that it may be compatible with vapor-solid diffusion so that the two may be carried on simultaneously, is achieved by continuous evaporation of the silicon while vapor-solid diffusion is being carried on.

In particular, it is in accordance with the preferred practice of the present invention to heat the silicon to be treated to an appropriate temperature and for an appropriate time in a furnace which is connected to a vacuum system which permits the continuous evacuation of the furnace to a desired extent and which is provided with a continuous supply in vapor form of the significant impurity intended as the diffusant.

It is found that silicon evaporates readily when heated to temperatures in the range useful for diffusion so long as the vapor pressure at the region of the silicon surface is kept below its equilibrium value. Accordingly, to realize significant evaporation it appears important to pump the diffusion furnace continuously to keep the partial vapor pressure of silicon in the furnace from building up to a point where it inhibits further evaporation. Such evaporation continuously etches the surface so that it tends to produce a clean surface free of any contaminants or strains originally on the surface. In addition, since a new surface is continually being formed, it minimizes the build up of a residual surface film of high concentration of the impurity, which film ordinarily is undesirable.

In the process of the invention, the impurity is diffused into a continuously evaporating surface so that the effective rate of diffusion is reduced by the rate of evaporation.

In accordance with the preferred form of practice of the invention, it has been found possible by appropriate choice of parameters to establish substantial equilibrium within reasonable diffusion times between the rate at which the diffusant penetrates and the rate at which the silicon evaporates such that the thickness of the diffused layer becomes essentially independent of further treatment in this fashion. Analysis of the ideal case in which it is assumed that the semiconductor is vaporizing into a perfect sink, the vapor pressure of the diffusant is constant, and the rate of diffusion of the impurity is determined solely by the bulk diffusion coefficient, indicates that the steady state value of the layer thickness is dependent on the difference of the activation energies for vaporization and diffusion. If the activation energy for vaporization of the silicon exceeds the activation energy for diffusion of the impurity, then the steady state value will decrease with increasing temperature, and vice versa. In addition, since the difference of such activation energies is generally smaller than the activation energy for the diffusion of the impurity alone, the temperature coefficient of the change in steady state value with change in temperature will be smaller than the change in layer thickness when no vaporization was present.

It is accordingly characteristic of this preferred form of the practice of the invention that considerable latitude in the diffusion time and temperature is feasible which better adapts the invention to large scale applications where close control of such parameters might add to the fabrication cost.

On the other hand, the steady state thickness of the diffused layer can readily be controlled by the rate of evaporation permitted, which rate can easily be controlled by physical constants of the diffusion furnace. Accordingly, considerable flexibility is retained.

It is a further characteristic of the process of the invention that the evaporation itself may be used to achieve extremely thin wafers.

In one illustrative embodiment of the invention, silicon wafers which were originally p-type throughout were heated to approximately 1250° C. for two hours in a furnace one end of which was connected to a vacuum pump which was used to keep the furnace at a relatively high vacuum and the other end of which was supplied with the vapor emanating from phosphorus which was heated to 330° C. At the end of such time, there was formed on a freshly etched surface of each wafer a phosphorous-diffused layer which was approximately .2 mil thick and n-type.

In another illustrative embodiment to be described in greater detail below, there was introduced simultaneously into the furnace at the end opposite that by which the furnace was being evacuated in vapor form two appropriately chosen impurities characteristic of opposite conductivity types for simultaneous diffusion into the silicon for formation of superposed diffused layers of opposite conductivity type.

Figure 2:
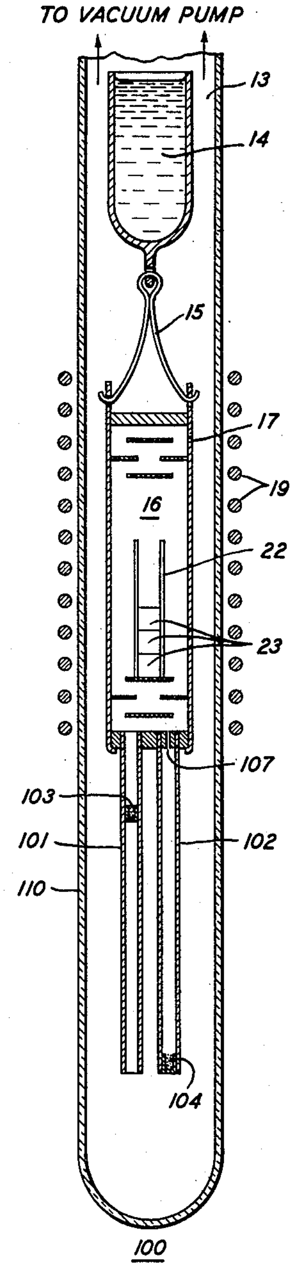

The invention will be better understood from the following more detailed description taken in conjunction with the accompanying drawing of which:

Fig. 1 illustrates in schematic form typical apparatus suitable for carrying out a diffusion of a single impurity in accordance with the invention; and Fig. 2 illustrates in schematic form typical apparatus for the simultaneous diffusion of two impurities characteristic of opposite conductivity type in accordance with the invention.

In Fig. 1, there is shown, drawn substantially to scale, apparatus 10 which has been used successfully for the vapor-solid diffusion of phosphorus into silicon in accordance with the principles of the present invention. The apparatus comprises a quartz jar 11 which houses various other components employed. The jar has an inner diameter of one and a half inches and has an overall length of about twelve inches, three inches of which consists of the elongated end extension 12 which has an inner diameter of one quarter inch. The jar is further provided at its top with an annular opening 13 through which it is kept evacuated by vacuum equipment (not shown) capable of keeping the pressure in the jar below $3\times10^{-7}$ millimeters of mercury. Commercial vacuum equipment is feasible for such application. At the top in the region of the annular opening, the bell jar includes a liquid nitrogen trap 14 from which is supported by tantalum wires 15, a tantalum bucket 16 which serves as the diffusion furnace. The bucket includes a main portion 16A which is approximately three and a half inches long with an inner diameter of one inch and an extension 16B which is approximately two and a half inches long with an inner diameter of about three-sixteenths of an inch. The bucket is suspended so that its extension 16B extends about an inch into the elongated extension 12 of the jar and the outer diameter of the bucket extension is such as to make a reasonably tight fit with the jar extension.

The bucket is provided with two openings to the atmosphere of the jar. The first opening is a hole 17 of about eighty mils diameter near the top of the side wall of the main portion of the bucket. The second opening is a bore of 35 mils diameter in the quarter inch base plate 18 which forms the end closure of the extension portion of the bucket.

Radio frequency coils 19 surround the jar. These are excited from a suitable voltage supply (not shown) for induction heating of the main portion of the bucket. The semiconductor to be treated is positioned on a suitable support in the main portion of the bucket at a region whose temperature is controlled by the current flowing in the radio frequency coils. The coils should be capable of heating the semiconductor to a temperature range in which the desired impurity has a suitable diffusion rate. With silicon, it is generally advantageous to employ a diffusion temperature between 1000° C. and the melting point of silicon.

A separate auxiliary heater 20 surrounds the end extension of the jar. In the bottom of the extension is deposited the significant impurity 25 which is to serve as the source of the diffusant. As a result, the temperature at which the significant impurity is kept is controllable by the auxiliary heater 20.

Radiation shields 21 are positioned in the bucket advantageously to provide increased thermal isolation between the semiconductor to be treated and the outside system.

Although the manner of diffusion does tend to minimize the effect of contaminants in the apparatus, it is advantageous nevertheless to start with equipment which is as clean as can be provided conveniently. To this end before the silicon wafers to be diffused are introduced for the first run under a given set of conditions, it is desirable to bake out the empty tantalum bucket before its insertion into the jar. It is generally adequate to heat the bucket to 1700° C. for half an hour.

It is also advantageous to subject the silicon wafers to be treated to a simple etch, such as CP–4 described in United States Patent 2,619,414 which issued November 25, 1952, and washing in deionized water before introduction into the furnace.

It has been found that the characteristics of the diffused layers are dependent to some extent on the geometry of the silicon in the furnace. For increased uniformity among individual wafers when a plurality are being treated simultaneously, it is advantageous to stack the wafers in a fashion to insure maximum uniformity of exposure of the surfaces of primary interest. In the specific embodiment being discussed in detail, there were treated simultaneously twenty silicon wafers, each one-fourth inch by one-fourth inch by 30 mils and of p-type conductivity with a specific resistivity of 6 ohm-centimeters. A tantalum support 22 was used to keep the wafers in position. These were formed into four groups of five, each group comprising five wafers stacked end to end to form one continuous surface one-fourth inch by five-fourths inches. The four groups were then arranged in the tantalum support so that each group formed one broad surface of a rectangular parallelepiped In Fig. 1, there is shown as a front view of the parallelepiped formed, a stack 23 of five wafers in the tantalum support.

After the apparatus had been assembled as depicted in Fig. 1, the jar was evacuated to a pressure therein below $1\times10^{-6}$ millimeters of mercury. Next, the tantalum bucket was heated gradually to get it up to the operating temperature of 1250° C. During such heating, the vacuum equipment was continued in operation to keep the pressure in that portion of the jar outside the bucket below $2\times10^{-6}$ millimeters of mercury. Of course, the vapor pressure in the tantalum bucket was considerably higher than this value. In particular, for the system described, the process is feasible so long as the total pressure in the bucket is kept below $10^{-1}$ millimeters of mercury. Then the auxiliary heater used to heat the vapor source was put in position surrounding the end section of the jar containing the vapor source which in the specific instance being described was approximately one cubic centimeter of red phosphorus. It was found expeditious to preheat the auxiliary heater before it was put in position. The auxiliary heater was adjusted so that the temperature of the solid phosphorus was 330° C.

The temperature at which the vapor source is kept is one means to control the partial pressure of the diffusant in the oven and, in turn, the surface concentration of the diffusant in the silicon. In this instance, the temperature chosen for the particular diffusant used resulted in a surface concentration of about $3\times10^{17}$ atoms per cubic centimeter. Other means to control the partial pressure of the diffusant in the oven are the two openings in the bucket. Their effect will be described in more detail below.

The diffusion was continued under the conditions described for about two hours. This resulted with each wafer in the formation of an n-type phosphorous-diffused surface layer which was approximately .2 mil thick. It was found that diffusion times for longer than two hours little affected the depth of the diffused layer. In effect, there is reached after such time a steady state where the rate of evaporation matches the effective rate of diffusion and the only significant effect of further heating is to reduce the overall thickness of the wafer.

It was further found that a change in temperature for the silicon in the process described resulted in a much smaller change in diffused layer thickness than a comparable change would have caused in the usual form of vapor-solid diffusion. In particular, a change of 100° C. in the temperature at which the silicon was kept was estimated to result in a change of about twenty percent in the opposite sense in the diffused layer thickness. In addition, it appears that the time to reach steady state decreases as the temperature of the silicon is increased.

It further appears that varying the temperature at which the vapor source is kept has little effect on the time necessary to reach steady state. However, the temperature of the vapor source did provide control over the surface concentration of the diffusant in the diffused layer and of the thickness of the diffused layer in the manner expected, i. e., an increase in temperature of the source increased the surface concentration and layer thickness, and vice versa.

It was also found that increasing the amount of total exposed silicon surface in the oven tended to increase both the thickness of the diffused layer and the time necessary to reach steady state.

It can be appreciated from the foregoing that the process of the invention has fewer parameters than former diffusion techniques that need to be controlled, a factor which is desirable from the standpoint of reproducibility.

Nevertheless, the process of the invention does retain considerable flexibility. In particular, it is, of course, unnecessary to operate only under steady state conditions. Additionally, it is characteristic that those parameters, which are easily subject to initial adjustment but which thereafter will remain fixed, generally provide sufficient control to make possible most structures which may be desired. For example, one parameter which may conveniently be used for control is the impurity employed as the diffusant. Different impurities will result in different layer thicknesses under a given set of steady state conditions. Other parameters of this type which once chosen may be treated as constants of the system include the sizes of the two openings in the bucket. The larger the size of the opening in the top of the bucket, the lower the equilibrium vapor pressure which builds up in the bucket and the faster the rate of silicon evaporation. This has the tendency to reduce both the thickness of the diffused layer at steady state and the time it takes to reach steady state. A decrease in the size of such opening has converse effects. However, to make feasible the practice of the invention in the manner described, it is important that the size of the opening be large enough to permit sufficient removal of silicon vapor from the bucket to permit significant evaporation of the silicon. In particular, it is desirable to remove from the original surface a layer at least .05 mil thick. To this end, it is preferable that the partial vapor pressure of the silicon in the bucket be kept no more than ninety percent of the value of the static silicon vapor pressure. However, it is feasible at the expense of longer times to reach steady state to operate with partial vapor pressures of silicon in the bucket as high as ninety-nine percent of the static value.

Additionally, an increase in the size of the opening in the end closure of the bucket tends to increase the partial vapor pressure of the diffusant in the bucket, a factor which, in turn, increases both the surface concentration of the diffusant and the thickness of the diffused layer when steady state is reached, but little affects the time needed to reach steady state.

Silicon bodies prepared this way have a wide variety of device applications. By providing separate ohmic connections to the diffused layer and to the bulk portion, there is prepared a p-n diode suitable for use as a rectifier or photovoltaic cell. Additionally, such bodies may be adapted for use in junction transistors of the diffused base type or in field effect transistors, as is described in copending application Serial No. 496,202, filed March 23, 1955, by C. A. Lee, G. C. Dacey and W. Shockley and having the same assignee as this application.

Moreover, it is, of course, unnecessary to limit the practice of the invention to the formation of diffused layers of opposite conductivity type. The process described by appropriate choice of the diffusant may be used to form diffused layers of the same conductivity type as the substrate but of lower specific resistivity.

Additionally, it has been found that in the absence of any significant amount of conductivity-type determining impurity in the diffusion furnaces heating of a silicon sample which has been doped uniformly with a conductivity-type determining impurity under conditions that permit both evaporation of the silicon surface and diffusion of the impurity in the sample results in the formation of a depleted surface layer in which the impurity has diffused out. Moreover, it is found that the thickness of such depleted layer tends to reach a steady state with continued heating under the conditions described. By combining diffusion in and diffusion out techniques of the kind described, considerable flexibility is possible.

In Fig. 2, there is shown apparatus 100 which has been used successfully for simultaneous diffusion of two impurities into a semiconductor which is undergoing evaporation. In most respects, this apparatus resembles that shown in Fig. 1, and to such an extent the same reference numerals have been used to designate corresponding elements. However, the tantalum bucket 16 of Fig. 2 is provided with two end extensions 101, 102 each of which has an inner diameter of about three-sixteenths of an inch and houses a different one of the two impurities to be employed as the diffusants. Additionally, this specific apparatus has been designed to eliminate the need for auxiliary heaters for controlling the temperatures of the vapor sources. To this end, there is provided in each extension a separate 103, 104 insert which is movable therealong and serves as a container for an impurity. In this instance, use is made of the temperature gradient along the tantalum bucket, and the position of each insert is adjusted so that the temperature at which the insert is kept has a desired value. The temperature can be controlled additionally by the position of the radio frequency coil along the quartz jar. It will be obvious that the apparatus shown in Fig. 1 may be modified along these lines to avoid the need for its auxiliary heater. Alternatively, by appropriate design of the quartz jar, it is possible to provide separate auxiliary heaters for one or each of the vapor sources.

In one application of the apparatus described, three silicon wafers, each one-fourth inch by one-fourth inch by 25 mils and n-type with a specific resistivity of 3.5 ohm-centimeters, were supported by tantalum supports in the high temperature portion of the oven. This portion of the oven was heated to about 1250° C. The jar was continuously evacuated in the same fashion as described in the first embodiment. The insert 103 containing 1. cubic centimeter of high purity gallium was positioned in one of the bucket extensions at a point corresponding to a temperature of about 950° C. and the insert 104 containing .1 cubic centimeter of high purity arsenic was positioned in the other bucket extension at a point corresponding to a temperature of about 250° C. The extension including the arsenic was provided with a constricting plug 107 which provided to the main portion of the bucket an opening for the arsenic which was one-fourth inch long and 35 mils diameter. This constriction is used to reduce the partial pressure of arsenic vapor in the region of diffusion and to avoid appreciable gallium condensation at the cooler arsenic insert. Steady state was reached after about two and a half hours of simultaneous diffusion and evaporation. At the end of such time, there was formed on each wafer a surface layer which was n-type because of a predominance of arsenic and a layer intermediate the surface layer and the bulk portion of the body which was p-type because of a predominance of gallium. Double layers result because gallium has a rate of diffusion in silicon which is higher than that of the arsenic so that it penetrates further, and under the conditions described it has a surface concentration in silicon lower than that of the arsenic so that arsenic tends to be predominant to the depth to which it diffuses. It is possible to adjust the relative surface concentrations the two impurities will have in the silicon by appropriate control of the partial vapor pressure each has in the bucket. Such partial vapor pressure will be determined by the temperature at which the vapor source is kept and the amount of leakage permitted from the vapor source to the region where the silicon is kept. It is evident, of course, that the value of the surface concentration of each impurity cannot be increased beyond the value corresponding to that of solid solubility. The general principles of simultaneous diffusion of donor and acceptor impurities and applications of such simultaneous diffusion to the fabrication of devices are described in detail in copending application Serial No. 516,674, filed June 20, 1955, by C. S. Fuller and M. Tanenbaum and having the same assignee as this application.

From the foregoing it should be evident that the principles may be extended to vapor-solid diffusion generally. The process of the invention may readily be adapted to the vapor-solid diffusion of any chosen impurity or group of impurities into silicon or the various other semiconductors which are characterized at temperatures in which vapor-solid diffusion is feasible by rates of evaporation which are comparable to the rates of diffusion. Typically, such other semiconductors include germanium-silicon alloys and selected ones of group III–group V intermetallic semiconductive compounds. For the purposes of the invention, the rates are comparable if there will be evaporated a layer at least .05 mil thick in the time it takes to form a diffused layer in the range useful for semiconductor device applications, typically 100 Angstroms to 5 mils.

Moreover, it is feasible in the practice of the invention to employ as the vapor sources compounds including elemental components suitable for use as conductivity-type determining impurities. In addition, in specific instances it is feasible to include in such compounds a component which will accelerate the rate of evaporation of the semiconductor when such rate is otherwise too low. Typically, such component would react with the semiconductor to form a compound which has a higher vapor pressure than the semiconductor proper.

As an alternative to, or supplement for, the continuous evacuation of the diffusion furnace by pumping, it is feasible to include in the diffusion furnace a material which will react with the semiconductor vapor in a way effectively to absorb continuously such vapor for maintaining the partial pressure of the semiconductor vapor at a value sufficiently low to make possible continuing evaporation of the semiconductor. Moreover, this technique may similarly be employed for added control of the partial vapor pressure of the diffusant in the diffusion furnace.

What is claimed is:

1. The process for vapor-solid diffusion of a conductivity-type determining impurity into a semiconductor comprising the steps of heating the semiconductor in a diffusion furnace to a temperature at which the desired impurity will diffuse into the semiconductor, and introducing the desired impurity in vapor form into the diffusion furnace at a controlled rate, while simultaneously evacuating the diffusion furnace for the evaporation of the semiconductor at a rate comparable to the rate of diffusion of the impurity into the semiconductor.

2. The process for vapor-solid diffusion of a conductivity-type determining impurity into a semiconductor comprising the steps of heating the semiconductor in a diffusion furnace at a temperature at which the desired impurity will diffuse into the semiconductor and introducing into the diffusion furnace in vapor form the impurity while evaporating the surface of the semiconductor at a rate comparable to the rate of diffusion of the impurity into the semiconductor.

3. The process for vapor-solid diffusion of a conductivity-type determining impurity into a semiconductor comprising the steps of heating the semiconductor in a diffusion furnace at a temperature at which the desired impurity will diffuse into the semiconductor, introducing into the diffusion furnace in vapor form the impurity to be diffused, evacuating continuously the diffusion furnace to maintain the vapor pressure therein sufficiently low that evaporation of the semiconductor occurs during diffusion of the impurity, and continuing the diffusion at least until substantial equilibrium is reached between the rate of evaporation and the rate of diffusion whereby the thickness of the impurity-dominated layer in the semiconductor reaches a substantial steady state value.

4. The process for vapor-solid diffusion into a semiconductor comprising the steps of heating the semiconductor in a diffusion furnace to a temperature at which desired conductivity-type determining impurities will diffuse into the semiconductor, and introducing into the diffusion furnace such impurities to be diffused in vapor form while evacuating continuously the diffusion furnace for the evaporation of the semiconductor at a rate comparable with the rate of diffusion of the impurities into the semiconductor.

5. The process for vapor-solid diffusion of a conductivity-type determining impurity into silicon comprising the steps of heating the silicon in a diffusion furnace to a temperature at whch the desired impurity diffuses into the silicon and introducing into the diffusion furnace in vapor form the impurity to be diffused while evacuating the diffusion furnace to maintain the vapor pressure therein conducive to the evaporation of silicon at a rate comparable with the rate of diffusion therein of the impurity.

6. The process for vapor-solid diffusion into a semiconductor comprising the steps of heating the semiconductor in a diffusion furnace to a temperature at which two desired conductivity-type determining impurities of opposite kind will diffuse into the semiconductor, and introducing controlled amounts of the two desired impurities into the diffusion furnace while evaporating the surface of the semiconductor at a rate comparable to the rates of diffusion of the two impurities into the semiconductor for the formation of a pair of superposed layers of opposite conductivity over the surface of the body.

7. The process of claim 6 in which silicon is the semiconductor and gallium and arsenic are the two impurities.

8. The process for vapor-solid diffusion of a conductivity-type determining impurity into silicon comprising the steps of heating the silicon in a diffusion furnace at a temperature above 1000° C. and below the melting point of silicon and introducing into the diffusion furnace in vapor form the desired impurity while evaporating the surface of the silicon at a rate comparable to the rate of diffusion at least until substantial equilibrium is reached between the rate of evaporation and the rate of diffusion.

9. The process for vapor-solid diffusion of a conductivity-type determining impurity into a semiconductor wafer comprising heating the semiconductor wafer in a diffusion furnace in the presence of the vapor of the impurity and simultaneously maintaining the partial vapor pressure of the semiconductor in the region of the wafer below the equilibrium value whereby the semiconductive material evaporates continuously as the impurity diffuses, the duration and temperature of the heating being such that a wafer portion at least .05 mil deep is evaporated and the diffusant penetrates between 100 Angstroms and 5 mils into the wafer.

10. The process for vapor-solid diffusion of a conductivity-type determining impurity into a semiconductive wafer comprising heating the semiconductive wafer in a diffusion furnace in the presence of vapor of the impurity at a temperature at which the impurity will diffuse into the semiconductive wafer, simultaneously maintaining the partial vapor pressure of the semiconductor in the region of the wafer below the equilibrium value such that evaporation of the semiconductive material occurs, and continuing the heating and diffusion at least until substantial equilibrium is reached between the rate of evaporation and the rate of diffusion.

References Cited in the file of this patent

UNITED STATES PATENTS 2,695,852 Sparks ---------------- Nov. 30, 1954